United States Patent Office 2,693,129
Patented Nov. 2, 1954

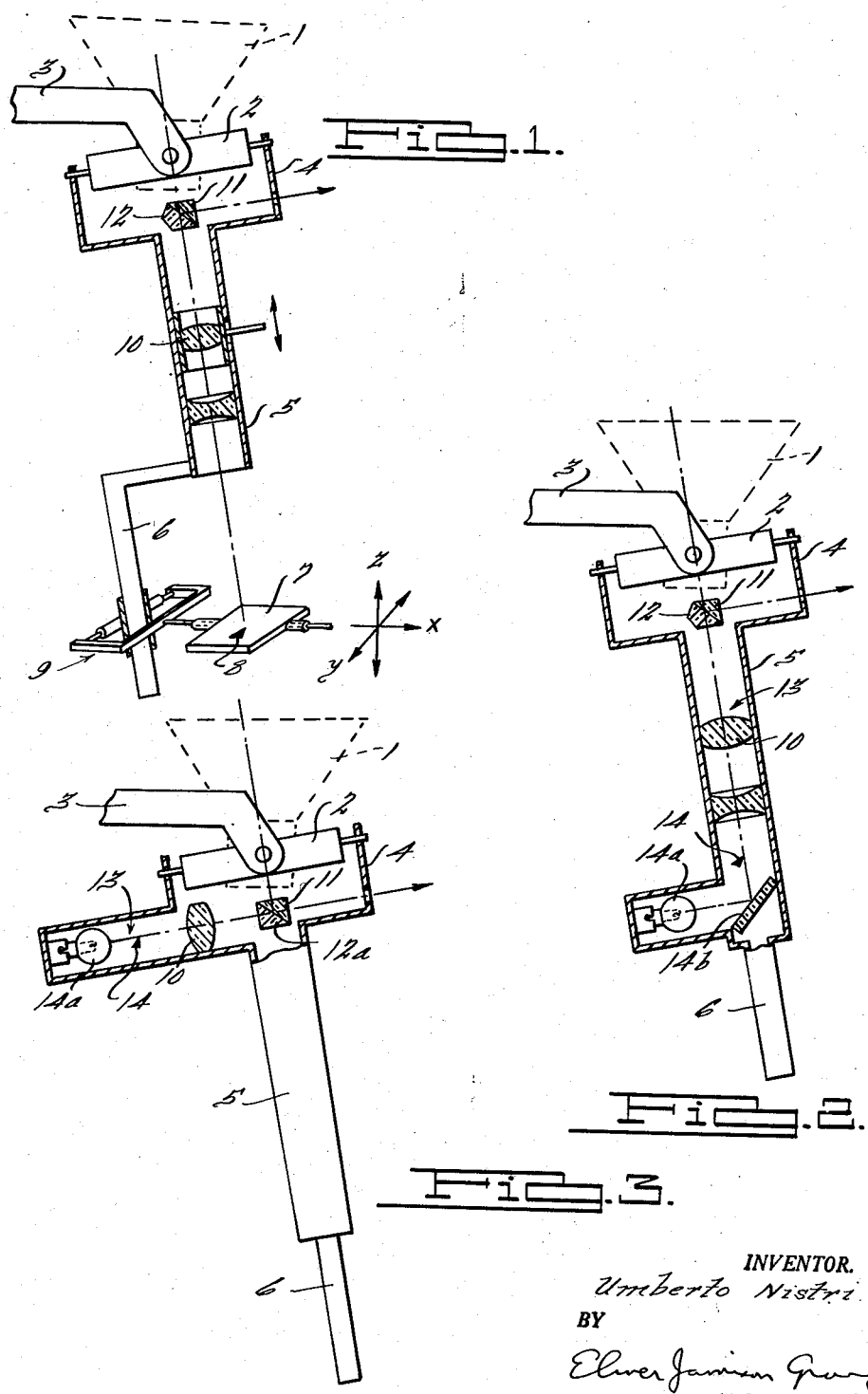

2,693,129

PHOTOGRAMMETRIC PLOTTING APPARATUS AND OPTICAL PROJECTING SYSTEM

Umberto Nistri, Rome, Italy

Application March 22, 1951, Serial No. 216,861

9 Claims. (Cl. 88—24)

Autograph photogrammetric plotting machines based on the principle of Deville are well known. In these plotting machines, the two cameras of the stereogram are arranged one in front of the other and, in front of the two optical systems of each of these cameras, two translucid mirrors at 45° are arranged, said mirrors having the object of transmitting the images leaving the two cameras to the eyes of the observer and, at the same time, to permit seeing, through the translucid mirrors themselves, the movement of a mark which is connected with a tracing pencil. Each of the two systems is therefore composed of a camera and of a translucid mirror at 45° arranged in front of the eye of the observer who can thus observe simultaneously the images of the photograms by reflection on the semi-silvered face of the mirror and the single true point moving in space through the semi-silvered surface of the mirror.

It is also known that, in order to avoid the annoying adjustment of the eye and the damaging effects of parallax which take place in the contemporary observation of an image, that of the photogram coming from an infinite distance, with a true sign, the mark, moving at a finite distance, Nistri (industrial Patent No. 324,031 of October 12, 1934) places between the translucid mirror and the mark an auxiliary optical system with a variable focal distance, which has the object of giving the observer the impression that the mark also comes from infinity. With this device, the images of the photogram and the mark blend together in an optically rational way and they can be easily observed or collected by an optical transmitting means which is of a known type and common to the autograph photogrammetric plotting machines of the stereoscopic binocular vision type, having the object of bringing the two directions, however oriented they may be in space and constituting the homologous rays of the object point under consideration, into two fixed and constant directions in order to permit better stereoscopic vision.

But the system as thus arranged, even if being entirely adequate under all points of view for the object of photogrammetic plotting, does not permit utilization of photograms taken with wide angle lenses since, beyond a certain limit, observation by reflection with the mirror arranged at 45°, besides requiring a notable size of mirror, is no longer easy because of the small angle of incidence of the rays emerging from the camera, and becomes entirely impossible when the semi-angle of the cameras comes close to 45°. The object of the present invention is to make possible, by means of an optical system which is as simple as it is practical, the simultaneous observation of the image of the object point emerging from the camera and of the mark, with any angle, both in reference to the principal axis of the camera and to its spatial arrangement.

Fig. 1 is a fragmentary schematic view of one of the optical system embodying the present invention for collimating images from a camera and from a reference mark, the camera being illustrated in broken lines.

Fig. 2 is a fragmentary schematic view similar to Fig. 1, but showing a modification of the invention.

Fig. 3 is a fragmentary schematic view similar to Figs. 1 and 2, but showing still another modification of the invention.

Fig. 1 shows one of the two systems of which the photogrammetic plotting machine is composed, and that is, one of the cameras and the mark. The other system is arranged symmetrically and the mark may be a single one or double in order to obtain the well known benefits permitted by the application of the Zeiss parallelogram. The single mark, or the system of two marks, moves in the space reserved for the formation of the optical model by means of a carriage having three orthogonal movements which are transmitted to the pencil in the well known manner. The optical transmitter for collecting and observing the images is not represented, since it is superfluous for the objects of the present invention.

Referring to Fig. 1, the three movements of position and arrangement allowed camera 1 to permit it to assume the corresponding spatial position in the formation of the optical model, are not represented, these movements being known and common to the photogrammetric plotting machines. A cardan 2, supported by a fork 3, is arranged with its center corresponding to the principal point of the camera 1. The movable cradle 4, with two degrees of freedom, of the cardan, supports a metal tube 5 which, by means of rod 6, is connected to the screen 7 on which is located the mark 8. The screen moves in space according to the three orthogonal movements and the rod 6, by means of its mechanical connection therewith, comprising the universal articulation 9, which is indicated schematically, maintains the metal tube 5 in approximate alignment with the direction which joins the center of the cardan 2 to the mark 8.

In the interior of the metal tube 5 is arranged a variable focal distance auxiliary optical system, the positive lens 10 of which moves within the tube in order to vary the focus of the system in relation to the spatial movement of the mark 8, so that the image of this latter may always be arriving optically from infinity. It is necessary, as is known, that in varying the focus of the auxiliary optical system, its principal point must always coincide with the center of the cardan 2. It is not entirely necessary, however, for the principal point of the camera 1 to coincide with the center of the cardan 2, because in this area the rays emerging from the camera 1 and those from the mark 8 are coming optically from infinity and are therefore parallel.

In this area, and to be exact between the optical system of the camera 1 and that of the auxiliary system, and fastened solidly to this latter on tube 5, a right angle prism 11 is arranged with its hypotenuse side semi-silvered and at 45° in relation to the principal axis of the auxiliary optical system. This surface has the duty of reflecting at 90° the image beam emerging from the camera 1 and having the direction of the mark 8, and of reflecting at 90°, but in the opposite direction, the image of the mark 8. A second, roof-type prism, 12, suitably arranged on the prolongation of these rays, transmits through the semi-silvered surface the image of the mark 8 in the same direction as the image of the camera 1.

The optical rays emerging from the camera 1 and from the auxiliary optical system are reflected by this same semi-silvered surface of prism 11 and, since the image of the mark 8 undergoes three reflections by means of the roof-type prism, the parallelism of the optical rays coming from the camera 1 with those from the mark 8 is rigorously maintained at their exit from the system of prisms thus composed.

Finally, since the system of prisms described moves in unison with the auxiliary optical system, the geometric condition described takes place for any spatial position of the mark 8, for any angular field of the camera 1 and for any position of the same, the only limitation being imposed by the amplitude of the mechanical movements assigned to the photogrammetric plotting machine.

Fig. 2 represents a variant to the device described above. In place of the mark 8 with its variable focal distance system, a fixed collimator 13 is arranged in tube 5, capable of furnishing the image of a mark or grid 14 placed in an unchangeable position along the tube 5 itself and illuminated by light from bulb 14a reflected from mirror 14b. In this case the tube 5 assumes the function of a mechanical rod to which is entrusted the precision of the alignment or, better, of the spatial direction considered, and the collimator 13 must stay with its axis invariably parallel to this direction.

In fact, while in the first case described in Fig. 1, the direction of tube 5 is independent from the principal point of the auxiliary optical system-mark direction which identifies the alignment considered in space, and it is only necessary to keep the mark 3 within the field of the auxiliary optical system, in the second case it is the mechanical support of the collimator 13 which identifies this alignment in space.

Fig. 3 represents a variant of the device shown in Fig. 2. The collimator 13 is arranged with its axis on the prolongation of the rays emerging from the camera 1 after the reflection caused by the semi-silvered surface of the prism.

In this manner prism 12 is replaced by a right angle prism 12a, but the spatial direction considered is always entrusted to the mechanical rod 5 and both the collimator 13 and the semi-silvered prism must maintain an unvarying position in reference to the mechanical rod.

What I claim is:

1. In a photogrammetric plotting machine having a camera for projecting an image and also having a movable reference mark, means for collimating the image from the camera and an image from said mark comprising a collimator having optical fusing means and adjustable focusing means and adapted at one end to receive the image rays from the camera and adapted at another end to receive image rays from the mark, a cardan supporting the collimator with the optical axis of the latter alignable with said image rays from the camera and mark, means connecting the collimator and mark for maintaining the same in alignment with said axis upon movement of the collimator, said fusing means comprising a right angle prism having a semi-silvered hypotenuse surface intersected by said axis at 45°, one face of the prism confronting the image rays from the camera to transmit the same, the portion of the transmitted camera image rays parallel to said axis being thereby reflected at right angles to said axis by said semi-silvered hypotenuse surface and the image rays from said mark being reflected perpendicularly to said axis in the opposite direction by said semi-silvered surface, and a roof-type prism arranged in juxtaposition with said hypotenuse surface to reflect said image rays from the mark back through the semi-silvered surface in parallelism with the reflected rays of the camera image.

2. A photogrammetric plotting device having a camera for projecting an image and also having a reference mark movable relatively to the camera, a movable support, an optical fusing means and an auxiliary optical system mounted on said support for movement as a unit therewith, said auxiliary system having a principal optical axis with said mark and fusing means thereon and being disposed optically intermediate said mark and fusing means to project image rays from said mark along said axis to said fusing means, the latter being disposed optically intermediate said camera and auxiliary optical system and having optical portions fixed with respect to said axis and arranged to direct the image rays, which are projected thereto from said auxiliary system along said axis, in a predetermined path fixed with respect to said axis, said fusing means also having optical portions fixed with respect to said axis and arranged to receive image rays, which are projected from the camera in a predetermined direction with respect to said axis, and to direct said rays along said path, thereby to fuse the rays from said mark and camera, and means connecting the support and mark to maintain the mark on said axis upon movement of the support.

3. In a photogrammetric plotting device having camera means for projecting an image and also having a reference mark movable relatively to the camera, a movable support mounted for universal pivotal movement, an optical fusing means and an auxiliary optical system mounted on said support for movement as a unit therewith, said auxiliary system having a principal optical axis with said mark thereon and being adapted to project image rays from said mark along said axis to said fusing means, the latter having a semi-reflecting semi-translucid surface fixed with respect to said axis and arranged angularly thereon intermediate said camera and auxiliary system to be moved into the projected image rays from said camera upon pivoting of said support, thereby to reflect along a predetermined path fixed with respect to said axis image rays which are projected onto said surface from said camera in a predetermined direction with respect to said axis, said fusing means also including roof-type prism means fixed with respect to said axis and arranged in juxtaposition with said surface on the side thereof proximate said auxiliary system to refract the projected image rays from said mark back through said surface in parallelism with the reflected rays of the camera image, and means connecting the support and mark to maintain the mark on said axis upon pivoting of the support.

4. In a photogrammetric plotting device having camera means for projecting an image and also having a reference mark movable relatively to the camera, a movable support having said mark fixed thereon, an auxiliary optical system mounted on the support to project image rays from said mark along the principal optical axis of the system, said axis angularly intersecting the path of image rays from said camera and being fixed with respect to said support, an optical fusing means fixed with respect to said axis and mounted on the support, said fusing means including a right angle prism having a semi-translucid semi-reflecting hypotenuse surface intersected by said axis at 45°, one face of the prism confronting the image rays from the camera to transmit the same and the other face of the prism being on the side of the hypotenuse remote from the auxiliary system, the portion of the transmitted camera image rays perpendicular to said axis being thereby reflected along the latter in the direction away from the auxiliary system, said fusing means also including a second right angle prism having its hypotenuse in juxtaposition with the hypotenuse of the first prism, said prisms thereby cooperating to transmit the projected image rays from the mark in parallelism with the reflected image rays from the camera.

5. In a photogrammetric plotting device having a camera and associated optical system for projecting an image and also having a reference mark, means for collimating image rays from the camera and mark comprising supporting means adjustably movable with respect to said camera, fusing means having a semi-translucid semi-reflecting surface and being mounted on said supporting means to move therewith into the path of image rays projected from said optical system onto one side of said surface at a predetermined angle oblique thereto to reflect the latter rays along a predetermined path with respect to said surface, an auxiliary optical system mounted on said supporting means to move therewith into alignment with said mark to project image rays therefrom onto the other side of said surface at a predetermined oblique angle fixed with respect thereto, optical means fixed with respect to said surface adjacent said other side thereof to refract the projected image rays from said mark back through said surface in parallelism with the reflected rays of the camera image.

6. In a photogrammetric plotting device having a camera and associated optical system for projecting an image and also having a reference mark movable independently of said camera, means for collimating image rays from the camera and mark comprising supporting means adjustably movable with respect to said camera, optical fusing means having a semi-translucid semi-reflecting surface and being mounted on said supporting means to move therewith into the path of image rays projected from said optical system at a predetermined fixed angle with respect to said fusing means, means for receiving and projecting image rays from said mark comprising an auxiliary optical system mounted on said supporting means to move therewith and arranged to project the image rays received thereby to said fusing means at a second predetermined fixed angle with respect to said fusing means, said surface being disposed obliquely in the path of said image rays projected from one of said optical systems at the corresponding fixed angle, thereby to reflect said rays from one side of said surface along a predetermined path fixed with respect thereto, said fusing means also including prism means adjacent the other side of said surface and arranged to receive said image rays projected from the other of said optical systems at the corresponding fixed angle and to refract the last named rays through said surface from the other side thereof in parallelism with the rays reflected from said one side.

7. In a photogrammetric plotting device having a camera and associated optical system for projecting an image and also having a reference mark movable independently of said camera, means for collimating image rays from the camera and mark comprising supporting means adjustably movable with respect to said camera and mark, optical fusing means optically intermediate said optical system and mark, said fusing means having a semi-translucid semi-reflecting surface and being mounted on said supporting means to move therewith into the path of image rays projected from said optical system at a predetermined fixed angle with respect to said fusing means, an auxiliary optical system optically intermediate said mark and fusing means and having adjustable focusing means, said auxiliary optical system being arranged to project image rays received thereby to said fusing means at a second predetermined fixed angle with respect to said fusing means and being mounted on said supporting means to receive image rays from said mark upon adjusting movement of said supporting means, said surface being disposed obliquely in the path of said image rays projected from one of said optical systems at the corresponding fixed angle, thereby to reflect said rays from one side of said surface along a predetermined path fixed with respect thereto, said fusing means also including prism means adjacent the other side of said surface and arranged to receive said image rays projected from the other of said optical systems at the corresponding fixed angle and to refract the last named rays through said surface from the other side thereof in parallelism with the rays reflected from said one side.

8. In a photogrammetric plotting device having a camera and associated optical system for projecting an image and also having a reference mark movable independently of said camera, means for collimating image rays from the camera and mark comprising supporting means adjustably movable with respect to said camera and having said mark fixed thereon, optical fusing means having a semi-translucid semi-reflecting surface and being mounted on said supporting means to move therewith into the path of image rays projected from said optical system at a predetermined fixed angle with respect to said fusing means, an auxiliary optical system mounted on said supporting means to move therewith and arranged to project image rays from said mark to said fusing means at a second predetermined fixed angle with respect to said fusing means, said surface being disposed obliquely in the path of said image rays projected from one of said optical systems at the corresponding fixed angle, thereby to reflect said rays from one side of said surface along a predetermined path fixed with respect thereto, said fusing means also including prism means adjacent the other side of said surface and arranged to receive said image rays projected from the other of said optical systems at the corresponding fixed angle and to refract the last named rays through said surface from the other side thereof in parallelism with the rays reflected from said one side.

9. In a photogrammetric plotting device having a camera and associated optical system for projecting an image and also having a reference mark movable independently of said camera, means for collimating image rays from the camera and mark comprising supporting means adjustably movable with respect to said camera and having said mark fixed thereon, optical fusing means having a semi-translucid semi-reflecting surface and being mounted on said supporting means to move therewith into the path of image rays projected from said optical system onto one side of said surface at a predetermined angle oblique thereto to reflect the latter rays along a predetermined path fixed with respect to said surface, an auxiliary optical system mounted on said supporting means to move therewith and arranged to project image rays from said mark through said fusing means from the other side of said surface in parallelism with the reflected image rays from the camera.

References Cited in the file of this patent

UNITED STATES PATENTS

| Number | Name | Date |
|---|---|---|
| 1,467,163 | Hugershoff | Sept. 4, 1923 |
| 1,478,693 | Bauersfeld | Dec. 25, 1923 |
| 1,504,384 | Schneider | Aug. 12, 1924 |
| 1,655,306 | Barr et al. | Jan. 3, 1928 |
| 1,673,680 | Hugershoff | June 12, 1928 |
| 1,985,260 | Miller | Dec. 25, 1934 |
| 2,121,255 | Miller | June 21, 1938 |